US012523953B2

(12) United States Patent
Umeda et al.

(10) Patent No.: US 12,523,953 B2
(45) Date of Patent: Jan. 13, 2026

(54) HEATING DEVICE AND IMAGE FORMING APPARATUS

(71) Applicant: CANON KABUSHIKI KAISHA, Tokyo (JP)

(72) Inventors: Kensuke Umeda, Kanagawa (JP); Shinsuke Kobayashi, Kanagawa (JP); Ai Suzuki, Tokyo (JP); Kazuhiro Funatani, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/731,507

(22) Filed: Jun. 3, 2024

(65) Prior Publication Data

US 2024/0319643 A1 Sep. 26, 2024

Related U.S. Application Data

(63) Continuation of application No. 17/939,562, filed on Sep. 7, 2022, now Pat. No. 12,025,933.

(30) Foreign Application Priority Data

Sep. 13, 2021 (JP) ................................ 2021-148344

(51) Int. Cl.
*G03G 15/20* (2006.01)
*G03G 21/20* (2006.01)

(52) U.S. Cl.
CPC ..... *G03G 15/2053* (2013.01); *G03G 15/2017* (2013.01); *G03G 21/203* (2013.01)

(58) Field of Classification Search
CPC ........... G03G 15/2017; G03G 15/2053; G03G 21/20; G03G 21/203
See application file for complete search history.

(56) References Cited

U.S. PATENT DOCUMENTS 8,977,179 B2 3/2015 McDavid et al.
9,383,696 B2 * 7/2016 Nojima ............. G03G 15/2053

(Continued)

FOREIGN PATENT DOCUMENTS

CN 101673071 A 3/2010
CN 105487359 A 4/2016

(Continued)

OTHER PUBLICATIONS

Examination Report issued in Indian Appln. No. 202244051280, mailed Dec. 11, 2023.

(Continued)

*Primary Examiner* — Carla J Therrien
(74) *Attorney, Agent, or Firm* — ROSSI, KIMMS & McDOWELL LLP

(57) ABSTRACT

A heating device has a first rotating member that is heated by a heat source, and a second rotating member that forms a nip portion with the first rotating member, such that a recording material is heated up at the nip portion. The heating device further has: a first cover disposed along an outer peripheral surface of the first rotating member, so as to surround the first rotating member, and a second cover, disposed between the first cover and the first rotating member, and having a protruding portion that protrudes towards the first rotating member. In a longitudinal direction of the first rotating member, a length of the first rotating member is a first length, and a length of the protruding portion is a second length that is smaller than the first length.

10 Claims, 12 Drawing Sheets

(56) References Cited

U.S. PATENT DOCUMENTS

| | | | | |
|---|---|---|---|---|
| 9,501,008 | B2 * | 11/2016 | Nojima | G03G 15/2053 |
| 12,025,933 | B2 * | 7/2024 | Umeda | G03G 15/2017 |
| 2003/0086732 | A1 | 5/2003 | Abe et al. | |
| 2010/0061752 | A1 | 3/2010 | Sudo et al. | |
| 2011/0243598 | A1 | 10/2011 | Suzuki | |
| 2014/0086616 | A1 | 3/2014 | Nojima et al. | |
| 2016/0098009 | A1 | 4/2016 | Aoki et al. | |
| 2016/0349683 | A1 | 12/2016 | Maeda et al. | |
| 2016/0363894 | A1 | 12/2016 | Omata | |
| 2017/0108805 | A1 | 4/2017 | Nojima et al. | |
| 2017/0123355 | A1 * | 5/2017 | Yamano | G03G 15/2053 |
| 2017/0242380 | A1 | 8/2017 | Hayashi et al. | |

FOREIGN PATENT DOCUMENTS

| | | | |
|---|---|---|---|
| CN | 107450293 | A | 12/2017 |
| JP | 2003140435 | A | 5/2003 |
| JP | 2010249874 | A | 11/2010 |
| JP | 5895436 | B2 | 3/2016 |
| JP | 2016075781 | A | 5/2016 |
| JP | 2017003873 | A | 1/2017 |
| JP | 2017151136 | A | 8/2017 |

OTHER PUBLICATIONS

Office Action issued in U.S. Appl. No. 17/939,562, mailed Jun. 21, 2023.

Office Action issued in U.S. Appl. No. 17/939,562, mailed Dec. 1, 2023.

Notice of Allowance issued in U.S. Appl. No. 17/939,562, mailed Mar. 13, 2024.

Office Action issued in Chinese Appln. No. 202211092558.8 mailed Jul. 9, 2025.

* cited by examiner

FIG. 6

| | LONGITUDINAL LENGTH (mm) OF RESIN MEMBER | EVALUATION RESULT |
|---|---|---|
| PRESENT EMBODIMENT | 215 | GOOD |
| CONVENTIONAL EXAMPLE 1 | NONE | POOR |
| COMPARATIVE EXAMPLE 1 | 230 | POOR |
| COMPARATIVE EXAMPLE 2 | 200 | GOOD |
| COMPARATIVE EXAMPLE 3 | 180 | GOOD |
| COMPARATIVE EXAMPLE 4 | 166 | GOOD |
| COMPARATIVE EXAMPLE 5 | 150 | POOR |

FIG. 8

| | LONGITUDINAL LENGTH (mm) OF RESIN MEMBER | EVALUATION RESULT |
|---|---|---|
| PRESENT EMBODIMENT | 215 | GOOD |
| CONVENTIONAL EXAMPLE 2 | NONE | POOR |
| COMPARATIVE EXAMPLE 6 | 230 | POOR |
| COMPARATIVE EXAMPLE 7 | 200 | GOOD |
| COMPARATIVE EXAMPLE 8 | 180 | GOOD |
| COMPARATIVE EXAMPLE 9 | 166 | POOR |
| COMPARATIVE EXAMPLE 10 | 150 | POOR |

FIG. 11

| | LONGITUDINAL LENGTH (mm) OF RESIN MEMBER | L/2 (mm) | LONGITUDINAL POSITION (mm) OF IMAGE DEFECT |
|---|---|---|---|
| COMPARATIVE EXAMPLE 9 | 166 | 83 | 100.5 |
| COMPARATIVE EXAMPLE 10 | 150 | 75 | 88 |
| COMPARATIVE EXAMPLE 11 | 100 | 50 | 55 |

HEATING DEVICE AND IMAGE FORMING APPARATUS

BACKGROUND OF THE INVENTION

Field of the Invention

The present invention relates to an image forming apparatus such as a laser printer, a copier or a fax machine, in which a toner image formed on an image bearing member using an electrophotographic system or an electrostatic recording system is transferred to a transfer material. Further, the present invention relates to a heating device such as a fixing unit mounted on an image forming apparatus, or a gloss imparting device for increasing the gloss value of a toner image that is fixed to a recording material, through re-heating of the toner image.

Description of the Related Art

As an example of such electrophotographic image forming apparatuses, a commonplace configuration involves transfer of a toner image onto a recording material, with heating, in an image forming portion. Japanese Patent Application Publication No. 2017-3873 discloses such an apparatus having a configuration wherein a cover is provided that covers the entire surface of a heating portion, in the longitudinal direction, in order to prevent that products generated on account of the influence of heat in the heating portion should be discharged out of the heating device.

SUMMARY OF THE INVENTION

In a configuration provided with a cover, such as that described in Japanese Patent Application Publication No. 2017-3873 above, a recording material generates, when heated, water vapor that flows then to the image forming portion, and adheres to a print surface of a photosensitive member or the like, which may give rise to image defects.

It is thus an object of the present invention, arrived at in the light of the above issues, to suppress the influence of water vapor generated through heating of a recording material.

A heating device of the present invention in which a recording material is heated at a nip portion comprising:

a first rotating member that is heated by a heat source; and a second rotating member that forms the nip portion with the first rotating member, wherein the heating device further comprises:

a first cover disposed along an outer peripheral surface of the first rotating member, so as to surround the first rotating member; and a second cover disposed between the first cover and the first rotating member; the second cover having a protruding portion that protrudes towards the first rotating member; and wherein in a longitudinal direction of the first rotating member, a length of the first rotating member is a first length, and a length of the protruding portion is a second length that is smaller than the first length.

An image forming apparatus of the present invention in which an image is formed on a recording material, comprising:

a transfer mechanism that has a photosensitive drum that supports a toner image, a charging unit for charging the photosensitive drum, and a transfer roller that forms a transfer nip portion with the photosensitive drum, such that the transfer mechanism transfers the toner image onto the recording material; and a heating mechanism which has a first rotating member that is heated by a heat source, and a second rotating member that forms a nip portion with the first rotating member, such that the heating mechanism fixes the toner image onto the recording material;

wherein the heating mechanism has a first cover disposed along an outer peripheral surface of the first rotating member, so as to surround the first rotating member; and a second cover disposed between the first cover and the first rotating member, the second cover having a protruding portion that protrudes towards the first rotating member; and wherein in a longitudinal direction of the first rotating member, a length of the first rotating member is a first length, and a length of the protruding portion is a second length that is smaller than the first length.

The present invention allows suppressing the influence of water vapor generated through heating of a recording material.

Further features of the present invention will become apparent from the following description of exemplary embodiments with reference to the attached drawings.

BRIEF DESCRIPTION OF THE DRAWINGS

FIG. 6 is a table with evaluation results according to a first embodiment;

FIG. 8 is a table with evaluation results according to a second embodiment;

FIG. 11 is a table illustrating positions of occurrence of image defects in comparative examples according to a second embodiment.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
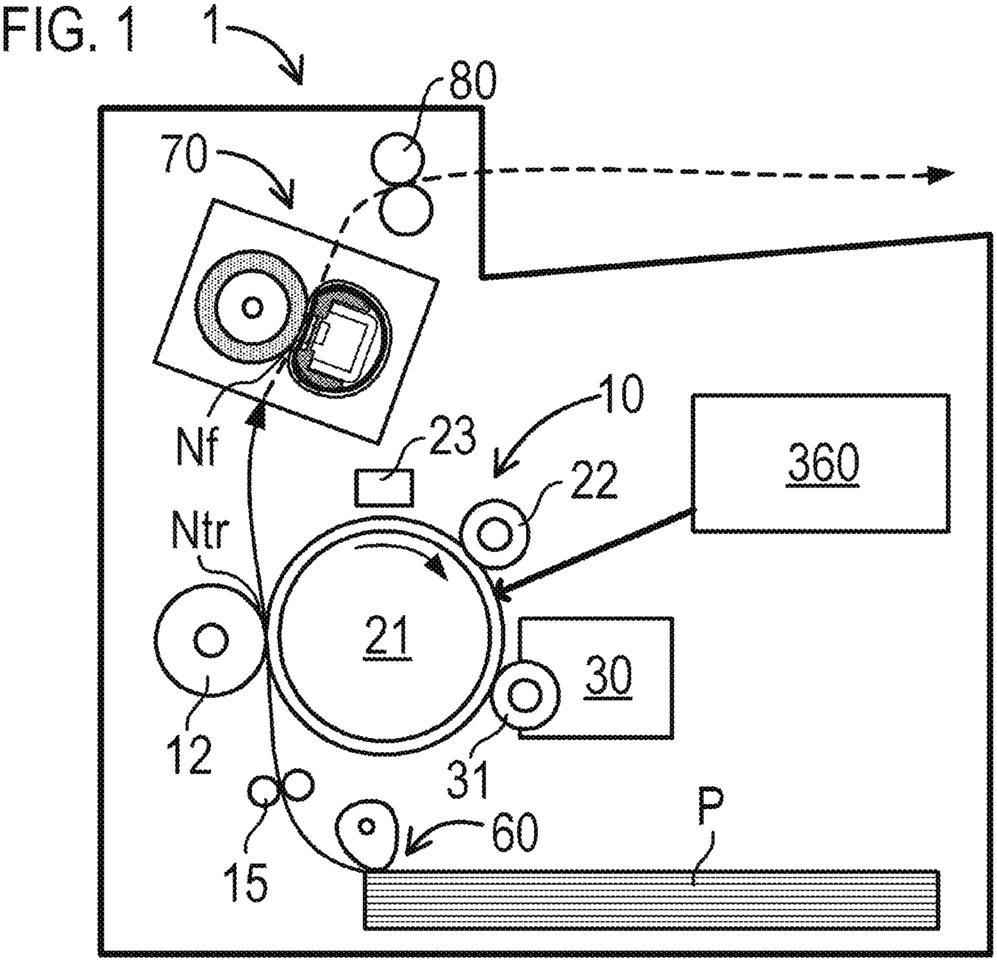
FIG. 1 is a schematic diagram illustrating the configuration of an image forming apparatus according to a first embodiment.

FIG. 1 is a schematic diagram illustrating the configuration of an image forming apparatus 1 according to a first embodiment. Examples of image forming apparatuses to which the present invention can be applied include printers and copiers relying on an electrophotographic system or electrostatic recording system; herein an instance will be explained in which the present invention is applied to a monochrome printer in which images are formed on a recording material on the basis of image information that is inputted from an external device. Recording materials include paper such as plain paper and heavy paper, plastic films such as sheets for overhead projectors, sheets of special shapes, such as envelopes and index paper, as well as various sheet materials made up of different materials, such as cloth. The maximum width of a recording material P used in the image forming apparatus 1 in the present embodiment is LTR width, and a print surface width is 206 mm.

Configuration of the Image Forming Apparatus

The image forming apparatus 1 has an image forming portion 10 in which a toner image is formed on a recording material P, a feeding portion 60 that feeds a recording material P to the image forming portion 10, a fixing apparatus 70, as a heating mechanism, that fixes the toner image to the recording material P, and a discharge roller pair 80 that discharges the recording material P onto a paper ejection portion. The recording material P is fed from the feeding portion 60 to the image forming portion 10 by a registration roller pair 15. Further, the image forming apparatus 1 has a control portion, not shown, for controlling an image forming operation performed on the recording material P in the image forming portion 10.

The image forming portion 10 is a transfer mechanism that has a scanner unit 360, a photosensitive drum 21 that supports a toner image, and a transfer roller 12 that transfers the toner image formed on the photosensitive drum 21 onto a recording material. The transfer roller 12, which together with the photosensitive drum 21 forms a transfer nip Ntr as a transfer nip portion, transfers the toner image to the recording material P, while the recording material is nipped and conveyed. A charging roller 22, a pre-exposure device 23, and a developing apparatus 30 that includes a developing roller 31 are disposed around the photosensitive drum 21. The rotation axes of the developing roller 31, the discharge roller pair 80 and the registration roller pair 15 are parallel to the rotation axis of the photosensitive drum 21. The photosensitive drum 21, the charging roller 22, the developing roller 31 and so forth are elongate rotatable members in the longitudinal direction, which is perpendicular to the conveying direction of the recording material P.

The photosensitive drum 21 is a photosensitive member shaped as a cylinder. The photosensitive drum 21 of the present embodiment has a photosensitive layer formed of a negatively chargeable organic photosensitive member, on a drum-shaped substrate formed of aluminum. Further, the photosensitive drum 21 as an image carrier is rotationally driven by a motor in the direction of the arrow. The process speed in the present embodiment is 130 mm/sec.

The charging roller 22, as a charging unit, comes into contact with the photosensitive drum 21 at a predetermined pressure contact force, to form a charged portion. The charging roller 22 applies a desired charging voltage, by means of a charging high-voltage power source, to thereby uniformly charge the surface of the photosensitive drum 21 to a predetermined potential. In the present embodiment the photosensitive drum 21 is negatively charged by the charging roller 22.

The pre-exposure device 23 eliminates static from the surface potential of the photosensitive drum 21 prior to entry into the charged portion, for the purpose of generating stable discharge in the charged portion.

The scanner unit 360, as an exposure unit, performs scanning exposure of the surface of the photosensitive drum 21 by irradiating the photosensitive drum 21, using a polygon mirror, with a laser beam that corresponds to image information inputted from an external device. An electrostatic latent image corresponding to the image information becomes formed on the surface of the exposed photosensitive drum 21. The scanner unit 360 is not limited to a laser scanner device, and for instance an LED exposure device having an LED array in which multiple LEDs are disposed along the longitudinal direction of the photosensitive drum 21 may be used herein.

The developing apparatus 30 of the present embodiment relies on a contact developing scheme as the developing scheme. Specifically, the toner layer supported on the developing roller 31, as a developing unit, comes into contact with the photosensitive drum 21 in a developing portion (developing zone) at which the photosensitive drum 21 and the developing roller 31 face each other. A developing voltage is applied to the developing roller 31 by a developing high-voltage source. Under the developing voltage, the toner carried on the developing roller 31 is transferred from the developing roller 31 to the drum surface in accordance with the potential distribution on the surface of the photosensitive drum 21; as a result, the electrostatic latent image on the photosensitive drum becomes developed into a toner image. In the present embodiment a reverse development method is resorted to. That is, after being charged in the charging step the toner adheres to a surface region, of the photosensitive drum 21, the charge amount of which has decayed through exposure in the exposure step, whereupon a toner image becomes formed as a result.

The regular charging polarity of the toner of the present embodiment, with a specific gravity of 1.1, is negative. The toner particle size is 6 μm. A polymerized toner produced in accordance with a polymerization method is used herein as the toner of the present embodiment. The toner of the present embodiment is a non-magnetic one-component developer, containing no magnetic component, and which is applied onto the developing roller 31 mainly on account of intramolecular forces or electrostatic forces (image forces). However, a one-component developer containing a magnetic component may also be used. Besides a toner particle, the one-component developer may contain additives (for instance a wax or silica fine particles) for adjusting the flowability and charging performance of the toner. A two-component developer made up of a non-magnetic toner and a magnetic carrier may be used as the developer. In a case where a magnetic developer is used, for instance a cylindrical developing sleeve having a magnet disposed in the interior thereof is used as the developer carrier.

As the transfer roller 12 there is used a roller having an outer diameter of 14 mm and resulting from covering a nickel-plated steel rod having an outer diameter of 8 mm with a 3 mm thick foam sponge body containing NBR and epichlorohydrin rubber as main components. The volume resistance of the foam sponge is about 108 (2·cm. The transfer roller 12 is brought into contact with the photosensitive drum 21 at a pressure of 1 kg, and rotates accompanying the rotation of the photosensitive drum 21. To transfer the toner image from the photosensitive drum 21 to the recording material P, voltage is applied to the transfer roller 12 from a voltage source not shown.

In the present embodiment a drum cleaner-less system is utilized such that toner remaining on the photosensitive drum 21 without being transferred is negatively charged by the charging roller 22 and is returned to the developing apparatus 30. The size of the image forming apparatus can be reduced since a drum cleaner-less system does not require a waste toner container. The distance between the photosensitive drum 21 and a fixing nip Nf of the present embodiment is 45 mm.

Figure 2A:
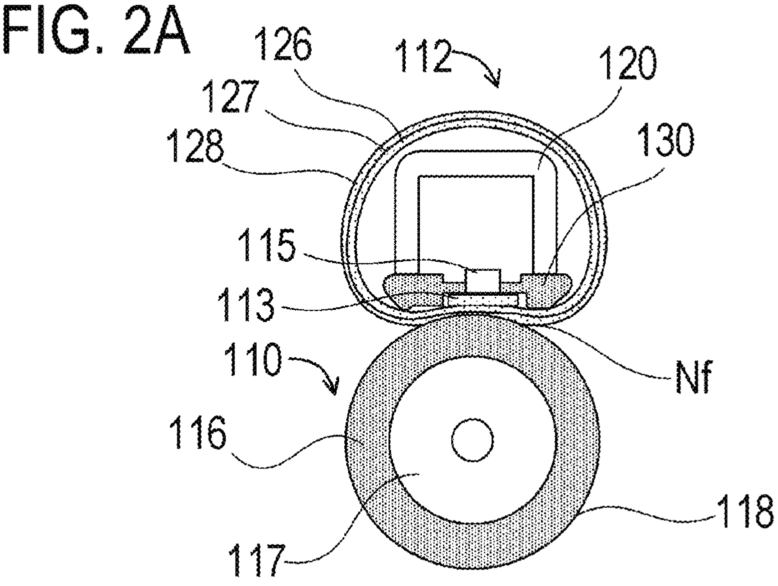
FIGS. 2A and 2B are a set of schematic diagrams illustrating the configuration of a fixing apparatus according to a first embodiment.
Figure 2B:
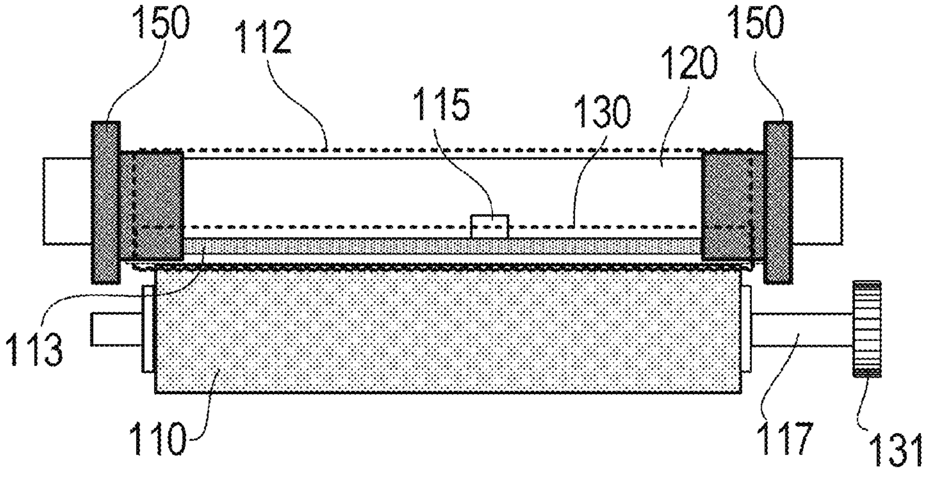

The fixing apparatus 70 of the present embodiment will be explained next. The fixing apparatus 70 of the present embodiment is an image heating device of film heating type, aimed at shortening a startup time and reducing power consumption, as described above. FIG. 2A illustrates a cross-sectional diagram depicting an outline of the fixing apparatus 70 in the present embodiment, and FIG. 2B illustrates a schematic diagram of the fixing apparatus 70 in the longitudinal direction, as viewed from the upstream side in the conveying direction. FIG. 2B depicts only the outlines of the fixing film 112 and a heater holder 130, in the form of dotted lines, so as to make the fashion of a heating heater 113 easier to grasp.

The fixing apparatus 70 of the present embodiment has a configuration in which a heating heater 113 as a heat source is held by the heater holder 130, and the fixing film 112 which is an endless belt is provided around the foregoing. The heater holder 130 is preferably made up of a material of low heat capacity so as to prevent, as much as possible, that heat be robbed from the heating heater 113; in the present embodiment there is used a liquid crystal polymer (LCP) which is a heat resistant resin. For the purpose of increasing strength, the heater holder 130 is supported by an iron stay 120 from the side opposite to the side where the heating heater 113 is provided. The heater holder 130 is in contact with the inner peripheral surface of the fixing film 112, to guide the rotation of the fixing film 112.

The stay 120 is pressed by a pressing spring, not shown, from both end portions in the longitudinal direction, towards a pressure roller 110. As illustrated in FIG. 2A, the heating heater 113 comes into contact with the inner peripheral surface of the fixing film 112 and heats the fixing film 112 from the inward side. On account of the pressure applied to the stay 120, a fixing nip Nf as a nip portion for heating and fixing is formed by the heating heater 113, together with the opposing pressure roller 110, so as to nip the fixing film 112. Specifically, the fixing nip Nf is formed through contact between the fixing film 112 as a first rotating member in the internal space of which the heating heater 113 is provided, and the pressure roller 110 as a second rotating member. Similarly to the fixing film 112, the pressure roller 110 and the heater holder 130, also the stay 120 is a member elongated in the longitudinal direction, perpendicular to the conveying direction of the recording material P and parallel to the rotation axis direction of the pressure roller 110.

The pressure roller 110 receives the force of a pressure spring via bearings, not shown, provided at both end portions of a core metal 117, and is driven by a drive gear 131, provided at the end portions of the core metal 117, by a drive source not shown. As the pressure roller 110 is driven, the fixing film 112 becomes driven rotationally so as to slide on the pressure roller 110 at the fixing nip Nf. As illustrated in FIG. 2B, fixing flanges 150 that restrict lateral deviation are provided at both end portions of the fixing film 112, for the purpose of preventing the fixing film 112 from deviating to the left or right in the longitudinal direction. The fixing flanges 150 are fitted and fixed to the stay 120. The fixing film 112 rotates while being supported from the inward surface thereof by the fixing flanges 150 provided at both end portions.

The fixing film 112 of the present embodiment has an outer diameter of 20 mm when in a cylindrical state of not being deformed, and has a multilayer structure in the thickness direction. The longitudinal length (length in the longitudinal direction) of the fixing film 112 is 230 mm. The fixing film 112 has a base layer 126 for maintaining the strength of the film, a conductive primer layer 127, and a release layer 128 for reducing adhesion of dirt to the surface.

The base layer 126 receives heat from the heating heater 113, and accordingly needs to be heat-resistant; moreover, the base layer 126 slides on the heating heater 113, and accordingly needs to be strong as well. Therefore, a metal such as stainless steel (SUS) or nickel, or a heat-resistant resin such as a polyimide may be used as the material of the base layer 126. Metals are stronger than resins and accordingly can be made thinner; also metals have high thermal conductivity, and hence make for ready transfer of heat from the heating heater 113 to the surface of the fixing film 112. On the other hand, resins have lower specific gravity than metals, and accordingly resins are advantageous in terms of having low heat capacity and of readily warming up. Moreover, resins can be molded into thin films by coating molding, and hence can be molded inexpensively. In the present embodiment, a polyimide resin was used as the material of the base layer 126 of the fixing film 112, with addition of a carbon-based filler to improve thermal conductivity and strength. The thinner the base layer 126, the more readily the heat of the heating heater 113 is transferred to the surface of the fixing film 112, but conversely strength drops when the base layer 126 is excessively thin; therefore, the thickness of the base layer 126 is preferably set to be about 15 μm to 100 μm, with a value of 60 μm being set in the present embodiment.

The conductive primer layer 127 is made up of a polyimide resin or a fluororesin, and for instance has carbon or the like added thereto, to lower resistance. The fixing film 112 stabilizes potential, at the time of paper passage, by grounding the exposed portion of a conductive layer.

Preferably, a fluororesin such as a perfluoroalkoxy resin (PFA), a polytetrafluoroethylene resin (PTFE) or a tetrafluoroethylene-hexafluoropropylene resin (FEP) is used as the material of the release layer 128. In the present embodiment, PFA having excellent mold releasability and heat resistance is used among fluororesins; herein a conductive material is dispersed therein, to confer medium resistance. The release layer 128 may be obtained through tube covering, or through coating of a surface with a coating material; in the present embodiment the release layer 128 is molded using a coat excellent in thin-wall molding. The thinner the release layer 128, the more readily the heat of the heating heater 113 is transferred to the surface of the fixing film 112, but conversely, durability worsens if the release layer 128 is excessively thin; therefore, the thickness of the release layer 128 is preferably set to be about 5 μm to 30 μm, with a value of 10 μm being set in the present embodiment.

The pressure roller 110 of the present embodiment has an outer diameter of 14 mm, and has a 2.5 mm thick elastic layer 116 of silicone rubber formed on the surface of an iron-made core metal 117 having an outer diameter of 9 mm.

A heat-resistant silicone rubber or fluorocarbon rubber is used in the elastic layer 116; in the present embodiment there is used a silicone rubber. The outer diameter of the pressure roller 110 is preferably about 10 to 50 mm. Heat capacity is kept low when the outer diameter of the pressure roller 110 is small, but conversely, an excessively small outer diameter translates into a narrower fixing nip Nf; accordingly, it is necessary to select an appropriate diameter. In the present embodiment the outer diameter was set to 14 mm. When the thickness of the elastic layer 116 is too small, heat escapes to the metal-made core metal, and accordingly the thickness must be appropriate; in the present embodiment the thickness was set to 2.5 mm. On the elastic layer 116 there is formed the release layer 118 made up of a perfluoroalkoxy resin (PFA), as a toner release layer. Similarly to the release layer 128 of the fixing film 112, the release layer 118 may be obtained through tube covering, or through coating of a surface with a coating material; in the present embodiment the release layer 118 was a tube excellent in durability and having a thickness of 20 μm. Besides PFA, a fluororesin such as PTFE or FEP, or a fluorocarbon rubber or silicone rubber having good releasability may be used as the material of the release layer 118. The lower the surface hardness of the pressure roller 110, the lighter is the pressure with which the width of the fixing nip Nf can be obtained; however, too low a surface hardness entails poor durability; therefore, the Asker-C hardness (600 g load) of the pressure roller 110 was set to 40° in the present embodiment. The pressure roller 110 rotates at a surface moving speed of 130 mm/sec, as prompted by a rotation means not shown.

The heating heater 113 of the present embodiment is a general heater used in heating devices of film heating type, in which resistive heating elements are provided in series on a ceramic substrate. As the heating heater 113 there was used a member obtained by applying a resistive heating element of Ag/Pd (silver-palladium) to a height of 10 μm, by screen printing, onto the surface of an alumina substrate high a width of 6 mm and a thickness of 1 mm, and by covering the applied resistive heating element with 50 μm thick glass, as a heating element protective layer.

As illustrated in FIG. 2A, a temperature detecting element 115 for detecting the temperature of the ceramic substrate is disposed on the back surface of the heating heater 113. The temperature of the heating heater 113 is adjusted by appropriately controlling the current flowing through the resistive heating element, in accordance with a signal from the temperature detecting element 115. The higher the temperature of the heating heater 113, the higher power consumption is, and hence the temperature needs to be set appropriately. In the present embodiment, the control temperature for running of plain paper was set to 180° C.

A thermal fuse (not shown), which is a safety element, is disposed on the back surface of the heating heater 113, for the purpose of ensuring safety through circuit breakage in a case where the heating heater 113 overheats abnormally. The heating heater 113 is connected to a commercial power supply via the thermal fuse. When heating up abnormally, the thermal fuse blows and the supply of power from the commercial power supply to the heating heater 113 is cut off. In the present embodiment a fixing unit of film heating type is used, but the present invention is not limited thereto, and for instance a thermal roller scheme relying on a halogen heater may be adopted instead.

Image Forming Operation

The image forming operation in the image forming apparatus 1 will be explained next. When an image formation command is inputted to the image forming apparatus 1, an image forming process by the image forming portion 10 is started on the basis of image information inputted from an external computer connected to the image forming apparatus 1. The scanner unit 360 projects laser light towards the photosensitive drum 21, on the basis of the inputted image information. At this time, the photosensitive drum 21 is charged beforehand by the charging roller 22, and is irradiated with the laser beam, as a result of which an electrostatic latent image becomes formed on the photosensitive drum 21. Thereafter, the electrostatic latent image is developed by the developing roller 31, and a toner image is formed on the photosensitive drum 21.

In parallel with the image forming process described above, the recording material P is fed to the registration roller pair 15 by the feeding portion 60, and skew is corrected through collision of the recording material P against the nip of the registration roller pair 15. The registration roller pair 15, which is driven in accordance with the transfer timing of the toner image, conveys then the recording material P towards the transfer nip Ntr formed by the transfer roller 12 and the photosensitive drum 21.

A transfer voltage is applied to the transfer roller 12, as a transfer means, from a transfer high-voltage source, whereupon the toner image supported on the photosensitive drum 21 becomes transferred to the recording material P, at the transfer nip Ntr. The recording material P having had the toner image transferred thereto is conveyed to the fixing apparatus 70, where the toner image is heated and pressed while being conveyed and nipped at the fixing nip Nf between the fixing film 112 and the pressure roller 110 of the fixing apparatus 70. As a result, toner particles melt and are thereafter fixed, whereby the toner image becomes fixed to the recording material P. The recording material P having passed through the fixing apparatus 70 is discharged out of the equipment by a discharge roller pair 80 as a discharge means.

Features of the Present Embodiment

Figure 3:
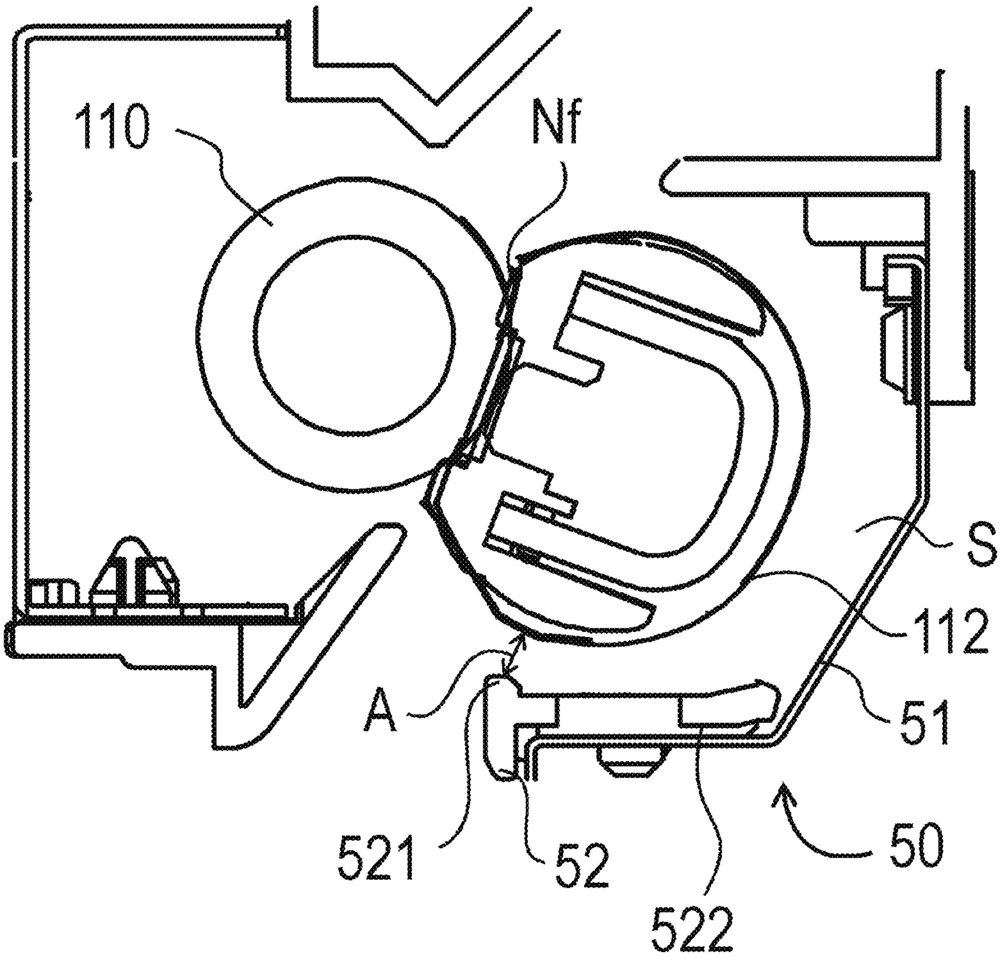
FIG. 3 is a schematic diagram illustrating the configuration of a cover according to a first embodiment.

A cover structure 50 of the fixing apparatus 70, which is a feature of the present embodiment, will be explained with reference to FIG. 3. The cover structure 50 is made up of a metallic member 51 as a first cover and a resin member 52 as a second cover. In the present embodiment the cover structure 50 is a constituent element of the fixing apparatus 70, but the cover structure 50 may also be envisaged as a member independent of the fixing apparatus 70.

The metallic member 51 is installed as a cover portion along the outer peripheral surface of the fixing film 112, over the entirety of the fixing film 112 in the longitudinal direction. The metallic member 51 is preferably of a metallic material, for the purpose of being formed with good precision; an electrogalvanized steel sheet is used in the present embodiment as the metallic member 51. An airflow guide space S for guiding airflow along the rotation direction of the fixing film 112 is formed between the outer peripheral surface of the fixing film 112 and the metallic member 51.

The resin member 52 is installed at the end portion of the metallic member 51, upstream of the fixing nip Nf in the conveying direction of the recording material. The resin member 52 is provided leaving a gap with the fixing film 112; herein a resin which is a soft material is used in the resin member 52, for the purpose of precluding image defects derived from damage to the fixing film 112, also in a hypothetical case that the resin member 52 came into contact with the fixing film 112 during rotation. In the present embodiment PBT is used as the material of the resin member 52.

The resin member 52 has a protruding portion 521 that protrudes towards the fixing film 112 (towards the heating rotating member), and a contact surface 522 connected to the metallic member 51. The contact surface 522 is installed so as to mirror the metallic member 51, whereby the space between the fixing film 112 and the protruding portion 521 is made narrower. The shortest distance between the fixing film 112 and the cover structure 50 is herein a distance A from the fixing film 112 to the protruding portion 521. Preferably, the distance between the fixing film 112 and the resin member 52 is short; in the present embodiment, the distance A from the outer peripheral surface of the fixing film 112 to the protruding portion 521 of the resin member 52 is set to 2.5 mm.

Figure 4A:
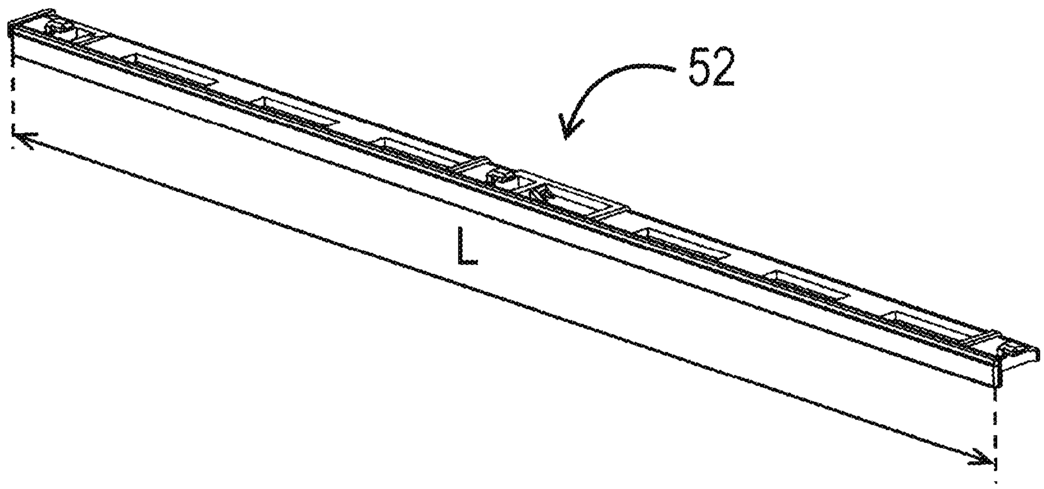
FIGS. 4A and 4B are a set of schematic diagrams illustrating a resin member according to a first embodiment.
Figure 4B:
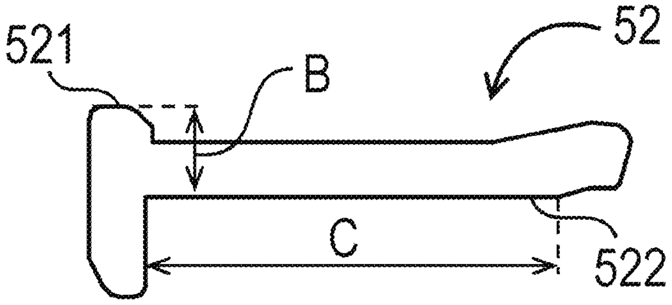

FIG. 4A is a perspective-view diagram of the resin member 52, and FIG. 4B is a cross-sectional diagram of the resin member 52. A longitudinal length L of the protruding portion 521 is smaller than the longitudinal length of the fixing film 112, for the purpose of controlling airflow around the fixing film 112. In the present embodiment the value of the longitudinal length of the protruding portion 521 is identical to that of the longitudinal length L of the resin member 52; however, it suffices that the longitudinal length of the protruding portion 521 be smaller than that of the fixing film 112, regardless of the longitudinal length of the resin member 52. In the present embodiment the longitudinal length L (second length of the second cover) of the resin member 52 is 215 mm, versus 230 mm as the longitudinal length of the fixing film 112 (first length of the first cover). A mechanism for controlling airflow around the fixing film 112 is described in detail below.

As illustrated in FIG. 4B, the resin member 52 has a contact surface 522 that comes in contact with the protruding portion 521 and the metallic member 51. The protruding portion 521 protrudes from the surface on the reverse side from that of the contact surface 522. The resin member 52 is formed so that a distance C, in a direction perpendicular to the longitudinal direction, and over which the contact surface 522 comes in contact with the metallic member 51, is larger than a distance B from the contact surface 522 to the tip of the protruding portion 521. By making the distance C larger, deflection peculiar to the resin is curtailed, and the protruding portion 521 is precisely disposed with respect to the fixing film 112, by virtue of the fact that the resin member 52 is installed mirroring the metallic member 51.

Airflow Direction

Figure 5A:
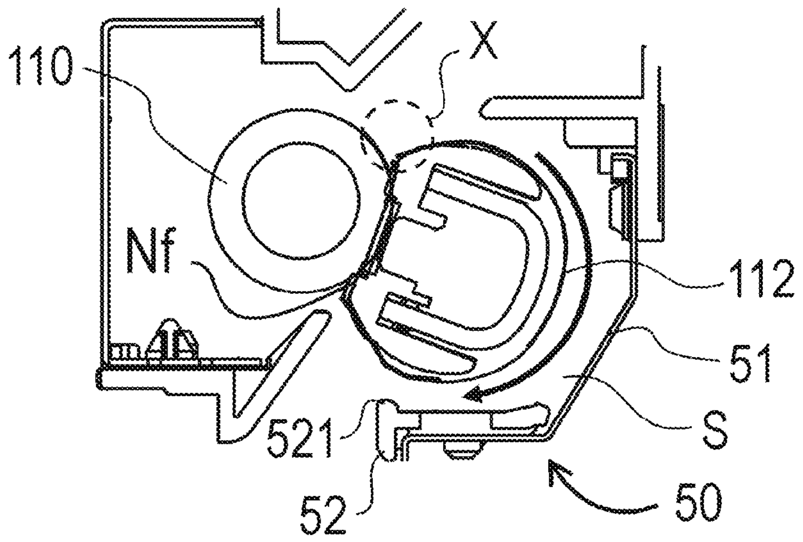
FIGS. 5A and 5B are a set of schematic diagrams illustrating airflow in the vicinity of a protruding portion according to a first embodiment.

When the recording material P is run through the fixing nip Nf, airflow is generated, as illustrated in FIG. 5A, in the direction of the arrow along the rotation direction of the fixing film 112, between the fixing film 112 and the cover structure 50, on account of the rotation of the fixing film 112. That is, the metallic member 51 of the cover structure 50 guides the airflow around the fixing film 112 along the outer peripheral surface of the fixing film 112. In a case where a recording material P acquires a significant moisture content by being allowed to stand in a high-temperature, high-humidity environment, water vapor becomes then generated, around X in the vicinity of the fixing nip outlet, upon passage of the recording material P through the fixing apparatus 70. This water vapor moves through the airflow guide space S in the rotation direction of the fixing film 112, and flows towards the fixing nip Nf from the downstream side to the upstream side in the conveying direction.

Figure 5B:
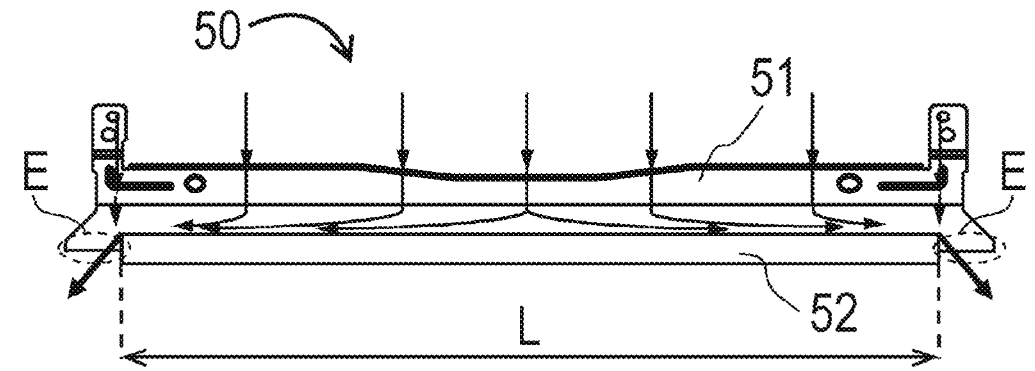

FIG. 5B is a diagram of the cover structure 50 as seen from the fixing film 112 side. In FIG. 5B, the airflow direction in the vicinity of the protruding portion 521 of the resin member 52 is indicated by arrows. Airflow from the vicinity of the fixing nip outlet X towards the resin member 52 along the rotation direction of the fixing film 112 collides against the protruding portion 521, and flows outward in the longitudinal direction, along the protruding portion 521. Open portions E through which airflow in the airflow guide space S is discharged out of the fixing apparatus are provided at both ends of the protruding portion 521 in the longitudinal direction. That is, airflow that is guided outward in the longitudinal direction, within the airflow guide space, is discharged out of the fixing apparatus through the open portions E. The direction of airflow discharged out of the fixing apparatus is controlled by providing thus the resin member 52, having a smaller longitudinal length than that of the fixing film 112, at the end portion of the metallic member 51, upstream of the fixing nip Nf in the conveying direction.

When a large amount of water vapor flows onto the print surface of the photosensitive drum 21, the photosensitive drum 21 may be overcharged by the charging roller 22, and image defects such as blank dots may occur. The occurrence of image defects increases in particular in a cleaner-less system configuration having no shield, such as a cleaning blade or a toner recovery container, as in the present embodiment. In a case however where the longitudinal length L of the resin member 52 of the cover structure 50 in the longitudinal direction is sufficiently large with respect to the print surface width W of the photosensitive drum 21, water vapor flows outward of the print surface width W, and accordingly it becomes possible to suppress inflow of water vapor onto the print surface of the photosensitive drum 21. In the present embodiment, specifically, airflow is controlled by the protruding portion 521 of the resin member 52 that protrudes towards the fixing film 112; as a result, image defects are suppressed that derive from water vapor generated in the vicinity of the downstream side of the fixing nip Nf, in the conveying direction.

In a case where on the other hand the longitudinal length L of the resin member 52 is too large, airflow becomes difficult to be guided outward in the longitudinal direction of the resin member 52. Both ends of the fixing film 112 are supported on respective side plates via flanges or the like. In a case where there is a sufficient gap between the side plates and the resin member 52, airflow is directed outward in the longitudinal direction of the resin member 52. In a case however where the resin member 52 is long and the width of the open portions E which are gaps between the resin member 52 and the side plates is small, then the amount of air escaping from the open portions E is reduced, so that, as a result, air does not flow out but is discharged out of the fixing apparatus along the rotation direction of the fixing film 112.

Effect of the Present Invention

In order to ascertain the effect of the present invention, a paper passage evaluation was carried out to check the occurrence of image defects derived from water vapor. A configuration in which the cover structure 50 did not have the resin member 52 was similarly evaluated as Conventional example 1. As comparative examples there were evaluated multiple configurations in which the longitudinal length L of the resin member 52 was modified from 215 mm of the present embodiment. The longitudinal length L of the resin member 52 in the comparative examples is 230 mm in Comparative example 1, identical to the longitudinal length of the fixing film 112, and is 200 mm in Comparative example 2, 180 mm in Comparative example 3, 166 mm in Comparative example 4, and 150 mm in Comparative example 5. The evaluations were performed in a high-temperature, high-humidity environment (temperature 30° C., humidity 80%). The evaluation paper used was Xerox Vitality Multipurpose Paper (Letter size, 20 lb) having been allowed to stand in this high-temperature, high-humidity environment for 2 days. As pointed out above, the print surface width W of the evaluation paper is 206 mm. The evaluation image was a halftone print pattern, of which 50 prints were continuously outputted. Instances where the evaluation image exhibited no image defects such as blank dots upon output of 50 prints were rated as good, whereas instances where even one print exhibited image defects such as blank dots was rated as poor. Evaluation results are summarized in the table in FIG. 6. Further, FIGS. 7A to 7G illustrate the airflow direction at the end portion of the metallic member 51 at which the resin member 52 is provided, in the present embodiment, in a conventional example, and in comparative examples.

In the present embodiment no image defects occurred.

Figure 7A:
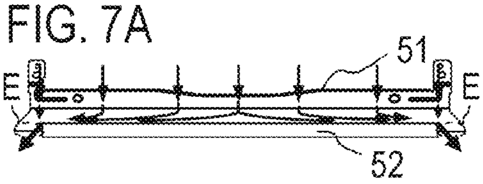
FIGS. 7A to 7G are a set of schematic diagrams illustrating airflow in the vicinity of a protruding portion in a paper passage evaluation.

As illustrated in FIG. 7A, in the present embodiment airflow is directed by the resin member 52 outward in the longitudinal direction. That is, through modification of the direction of the airflow that contained water vapor, it became possible to curtail inflow of water vapor onto the print surface of the photosensitive drum 21, and to prevent the occurrence of image defects.

Figure 7B:
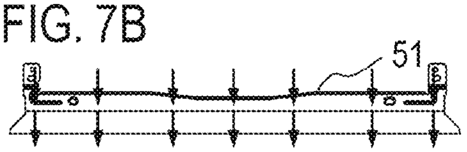

Image defects occurred in Conventional example 1. As illustrated in FIG. 7B, in Conventional example 1 there is no shield such as a protruding portion, and in consequence air flows along the rotation direction of the fixing film 112. Water vapor having flowed from the vicinity of the fixing nip Nf of the fixing apparatus 70, on the downstream side towards the upstream side in the conveying direction, flows thereafter towards the print surface of the photosensitive drum 21. Image defects occurred thus in Conventional example 1 on account of the water vapor that flowed onto the print surface of the photosensitive drum 21.

Figure 7C:
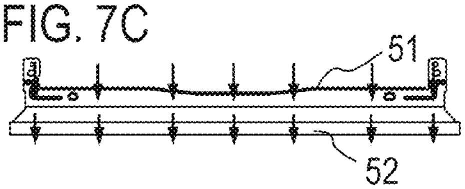

Image defects occurred in Comparative example 1. In Comparative example 1, the longitudinal length L of the resin member 52 is large, and there is substantially no gap through which water vapor passes. That is, although the resin member 52 has the effect of suppressing the flow of water vapor, there is however nowhere outward in the longitudinal direction of the resin member 52 where the water vapor can flow, and accordingly water vapor flows past the resin member 52 in the rotation direction of the fixing film 112, as illustrated in FIG. 7C. Specifically, in Comparative example 1 the effect of controlling the airflow direction elicited by the resin member 52 could not be achieved, and water vapor flowed onto the print surface of the photosensitive drum 21, which gave rise to image defects.

Figure 7D:
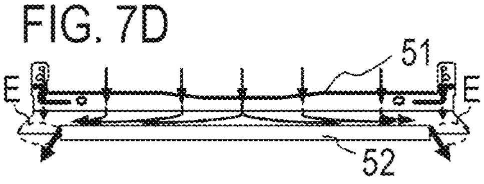
Figure 7E:
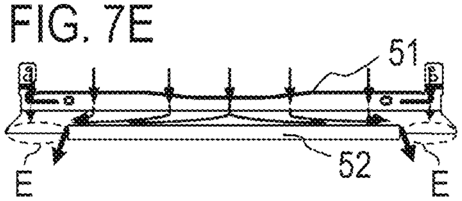
Figure 7F:
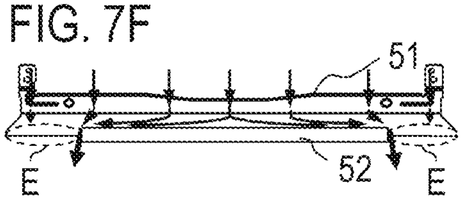

In Comparative examples 2, 3 and 4 no image defects occurred, although the longitudinal length L of the resin member 52 was smaller than that of the print surface width W. It is thus considered that Comparative examples 2, 3 and 4 are also implementations in which image defects are prevented by using the present invention. That is because in Comparative examples 2, 3, and 4 airflow is caused by the resin member 52 to pass through the open portions E and flow outward in the longitudinal direction, as illustrated in FIGS. 7D, 7E and 7F. Further, the smaller the longitudinal length of the resin member 52, the greater becomes the amount of air that flows out through the open portions E along the rotation direction of the fixing film 112 without hitting the resin member 52, as compared with the amount of air that hits the resin member 52 and is thereupon guided outward in the longitudinal direction. The orientation of the flow of air discharged out from the fixing apparatus 70 veers from outward in the longitudinal direction to a direction towards the vicinity of the center of the photosensitive drum 21.

Figure 7G:
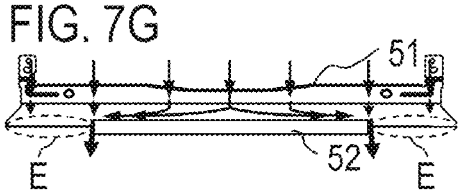

Image defects occurred in Comparative example 5. The longitudinal length L of the resin member 52 is small, and hence a large amount of water vapor flows out of the fixing apparatus 70 along the rotation direction of the fixing film 112 through the open portions E, without hitting the resin member 52, as illustrated in FIG. 7G. This affects the water vapor flowing outward in the longitudinal direction at the protruding portion 521, which thereupon flows in a direction along the rotation direction of the fixing film 112; the water vapor does not flow thus readily outward in the longitudinal direction. That is, an insufficient longitudinal length L of the resin member 52 caused water vapor to flow onto the print surface of the photosensitive drum 21, which gave rise to image defects in Comparative example 5.

In the present embodiment the process speed was set to 130 mm/sec; however, the length of the resin member 52 as required for suppressing image defects does not vary even if process speed increases. That is because flow of air is generated by the rotation of the fixing film 112, and the impact of process speed on airflow direction is small. In a case where the process side is fast, the amount of air leaking from the resin member 52 tends to increase; however, the speed at which the photosensitive drum 21 rotates is herein likewise high, and hence no significant difference arises in terms of the amount of water vapor flowing in per unit area of the photosensitive drum 21.

The apparatus in the present embodiment is a drum cleaner-less system, but by virtue of the resin member 52, similar results are achieved even if for instance a cleaning blade for toner cleaning, or a brush for recovering paper dust, is installed on the drum.

It is important to provide the resin member 52 at the end portion of the metallic member 51, upstream of the fixing nip Nf in the conveying direction, for the purpose of controlling the airflow direction. In a case where the fixing apparatus is of film heating type, moreover, the resin member 52 elicits also the effect lowering the likelihood of contact with the fixing film 112. That is because although the trajectory of the fixing film 112 may vary depending on the conveying state of the recording material, the trajectory of the fixing film 112 along the heater holder 130 is more stable in the vicinity of the upstream side of the fixing nip Nf, in the conveying direction, than in the vicinity of the downstream side in the conveying direction.

In the paper passage evaluation, the fixing film 112 and the resin member 52 did not come into contact with each other. However, the fixing film 112 may become deformed according to the shape of the nip in a configuration in which the pressure of the fixing film 112 and the pressure roller 110 is not released, and the nip formation state is maintained, even when no paper is passing. In such a case as well deformation is gradually reduced as a result of rotation of the fixing film 112, which returns thus to its original shape. Conversely, the fixing film 112 rotates in a deformed state immediately after rotation, and accordingly may come into contact with a member in the vicinity. In the present embodiment the resin member 52 provided in the vicinity of the fixing film 112 is formed of a resin, thanks to which there is reduced the likelihood of scratching of the surface of the fixing film 112 even upon contact thereof with the resin member 52.

As explained above, the resin member 52 having an appropriate longitudinal length and protruding from the fixing film 112 side is installed on the cover structure 50 that covers the entirety of the outer peripheral surface of the fixing film 112 in the longitudinal direction; as a result, airflow can be formed that is directed outward from the print surface of the photosensitive drum 21. This configuration allows suppressing inflow of water vapor onto the print surface of the photosensitive drum 21, and preventing the occurrence of image defects, even when water vapor is generated in the fixing nip Nf.

An instance is also conceivable in which water vapor stagnates and liquefies within the airflow guide space S, in a state where the image forming operation is stopped and the fixing film 112 is not fixed. In the present embodiment, the fixing film 112 is positioned above the photosensitive drum 21 in the vertical direction, with the cover structure 50 being provided in the space between the fixing film 112 and the photosensitive drum 21. Therefore, the cover structure 50 receives liquefied water vapor, if any, and hence an effect of preventing the water vapor from adhering to the photosensitive drum 21 can be expected to be elicited also in a state where the image forming apparatus 1 is not driven.

A monochrome laser printer that utilizes a monochrome toner of a single color has been explained as a typical example of an image forming apparatus that is provided with a transfer mechanism and a heating mechanism, and that has been subjected to a passage evaluation; however, the uses of the present invention are not limited to such an image forming apparatus. For instance, the present invention can be applied also to an image forming apparatus such as a color laser printer of tandem type, in which an image is formed through transfer of two or more color toners onto a recording material, via an intermediate transfer belt. Even in an image forming apparatus having a transfer belt, the present invention allows preventing water vapor generated in the fixing apparatus from adhering to the transfer belt or the print surface of the photosensitive drum, and thereby allows preventing the occurrence of image defects.

Second Embodiment

As a second embodiment, a configuration will be explained next in which the distance between the photosensitive drum 21 and the fixing nip Nf is set to be shorter than that in the first embodiment. In the present embodiment the distance between the photosensitive drum 21 and the fixing nip Nf is 35 mm, such that the size of the image forming apparatus is further reduced. An explanation of features of the image forming apparatus similar to those of the first embodiment will be omitted herein.

Effect of the Present Invention

In order to ascertain the effect of the present invention, a paper passage evaluation was carried out to check for the occurrence of image defects derived from water vapor. A configuration in which the cover structure 50 did not have the resin member 52 was similarly evaluated as Conventional example 2. As comparative examples there were evaluated multiple configurations in which the longitudinal length L of the resin member 52 was changed from 215 mm of the present embodiment. The longitudinal length L of the resin member 52 in the comparative examples is 230 mm in Comparative example 6, identical to the longitudinal length of the fixing film 112, and is 200 mm in Comparative example 7, 180 mm in Comparative example 8, 166 mm in Comparative example 9, and 150 mm in Comparative example 10. The evaluations were performed in a high-temperature, high-humidity environment (temperature 30° C., humidity 80%). The evaluation paper used was Xerox Vitality Multipurpose Paper (Letter size, 20 lb) having been allowed to stand in this high-temperature, high-humidity environment for 2 days. As pointed out above, the print surface width of the evaluation paper is 206 mm. The evaluation image was a halftone print pattern, of which 50 prints were continuously outputted. FIG. 8 sets out, in the form of a table, evaluation results in which instances where the evaluation image exhibited no image defects such as blank dots upon output of 50 prints were rated as good, whereas instances where even one print exhibited image defects such as blank dots are rated as poor.

In the present embodiment no image defects occurred. As in the first embodiment, in the present embodiment airflow is directed by the resin member 52 outward in the longitudinal direction, and it is possible to curtail inflow of water vapor, generated in the fixing apparatus 70, onto the print surface of the photosensitive drum 21.

Image defects occurred in Conventional example 2. That is because water vapor flows along the rotation direction of the fixing film 112, and flows onto the print surface of the photosensitive drum 21, similarly to Conventional example 1.

Image defects occurred in Comparative example 6. That is because, similarly to Comparative example 1, water vapor leaked out from between the resin member 52 and the fixing film 112 along the rotation direction of the fixing film 112, and flowed into the photosensitive drum 21.

In Comparative examples 7 and 8, the longitudinal length L of the resin member 52 was smaller than the print surface width W, but no image defects occurred. That is because, similarly to Comparative examples 2, 3 and 4, airflow is directed outward in the longitudinal direction by the resin member 52. That is, it is considered that Comparative examples 7 and 8 as well are implementations in which image defects are prevented by using the present invention.

Image defects occurred in Comparative examples 9 and 10. That is because the length of the resin member 52 was insufficient, and water vapor flowed onto the print surface of the photosensitive drum 21, as in Comparative example 5. In the present embodiment, air flows readily onto the print surface of the photosensitive drum 21, since the distance between the fixing nip Nf and the photosensitive drum 21 is shorter than that in the first embodiment. In consequence, no image defects occurred in Comparative example 4, but did occur in Comparative example 9, in which the longitudinal length L of the resin member 52 was the same as that of Comparative example 4. The longitudinal length L of the resin member 52 as required in order to suppress image defects is large when the distance between the fixing nip Nf and the photosensitive drum 21 is short. That is because even if the direction of air flowing out of the fixing apparatus 70 is the same, water vapor fails to flow outward from the print surface in proportion to the proximity of the photosensitive drum 21 to the fixing apparatus 70, but flows readily onto the print surface of the photosensitive drum 21.

It was therefore found that even in the present embodiment in which the distance between the fixing nip Nf and the photosensitive drum 21 is short, the occurrence of image defects can be prevented by installing a resin member 52 having an appropriate longitudinal length. That is, airflow outward from the print surface of the photosensitive drum 21 can be formed by installing a resin member 52 having an appropriate longitudinal length and that protrudes towards the fixing film 112, on the metallic member 51 that covers the periphery of the fixing film 112. This configuration allows suppressing the inflow of water vapor onto the print surface of the photosensitive drum 21, and preventing the occurrence of image defects, even in a case where water vapor is generated at the fixing nip Nf.

Relational Expressions

Figure 9A:
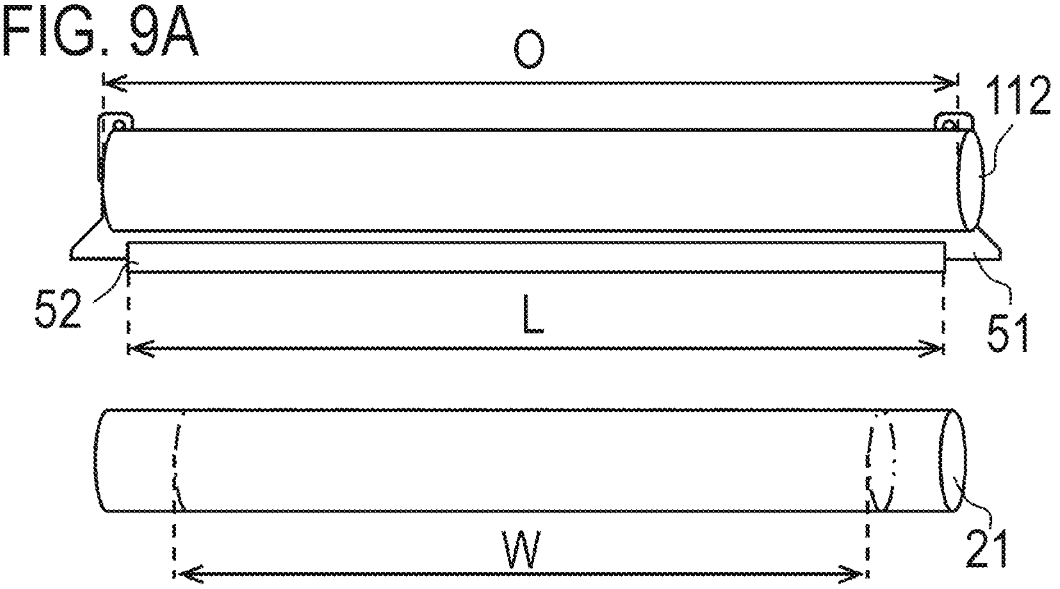
FIGS. 9A and 9B are a set of schematic diagrams illustrating the direction of movement of airflow towards a photosensitive drum.
Figure 9B:
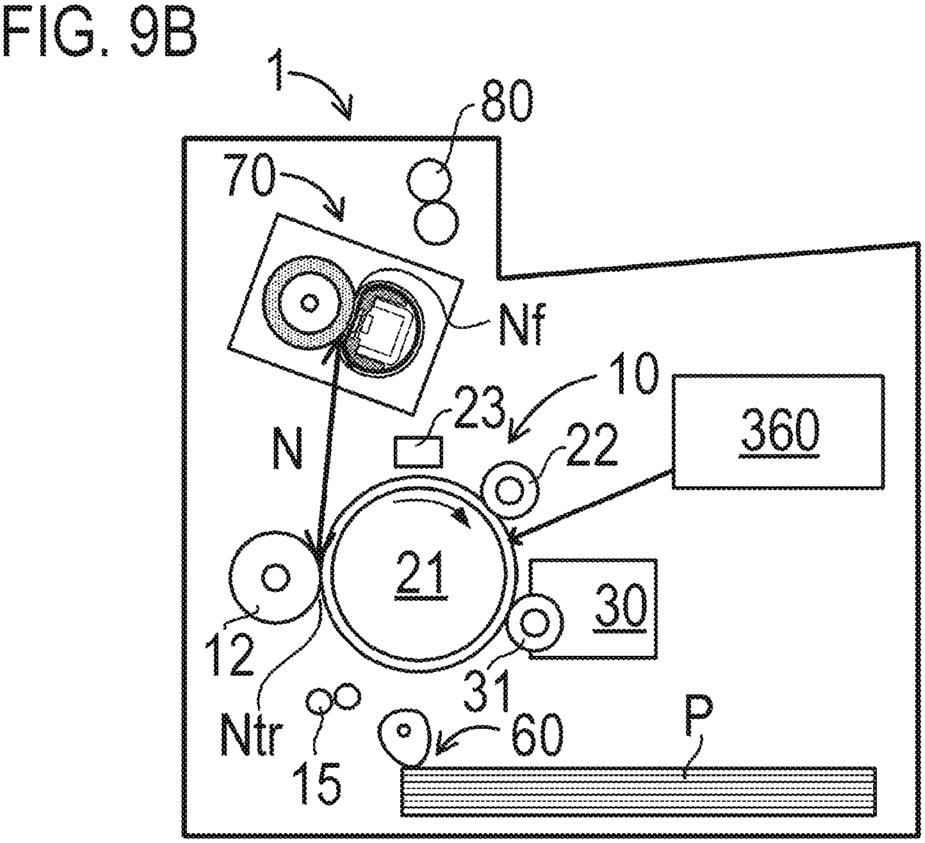

A relational expression for preventing the occurrence of image defects is derived herein where L denotes the longitudinal length of the resin member 52, W denotes the print surface width of the photosensitive drum 21, N denotes the distance between the fixing nip Nf and the photosensitive drum 21, and O denotes the longitudinal length of the fixing film 112. FIG. 9A is a schematic diagram illustrating the longitudinal length O of the fixing film 112, the longitudinal length L of the resin member 52 and the print surface width W of the photosensitive drum 21, and FIG. 9B is a schematic diagram of an image forming apparatus illustrating a distance N between the fixing nip Nf and the photosensitive drum 21. Herein, the distance between the fixing nip Nf and the transfer nip Ntr is calculated as the distance N between the fixing nip Nf and the photosensitive drum 21. Further, FIG. 9A depicts the print surface on the photosensitive drum 21 as a two-dot chain line.

The results in the paper passage evaluation carried out in the first embodiment and the second embodiment revealed that in a case where the longitudinal length L of the resin member 52 is excessively large, as in Comparative examples 1 and 6, air flowing past the resin member 52 does not flow outward in the longitudinal direction, and water vapor flows onto the print surface of the photosensitive drum 21. The paper passage evaluation revealed also that if the longitudinal length L of the resin member 52 with respect to the longitudinal length O of the fixing film 112 is equal to or greater than that in Embodiments 1 and 2, air flows through the open portions E, on the sides of both longitudinal end portions of the resin member 52, and water vapor does not flow onto the print surface of the photosensitive drum 21. The larger the difference O-L between the longitudinal lengths of the fixing film 112 and the resin member 52, and the smaller the longitudinal length L of the resin member 52, the better the flow of air around the fixing film 112 is directed outward in the longitudinal direction. Therefore, a value obtained by dividing the difference O-L of the longitudinal lengths of the fixing film 112 and the resin member 52 by the longitudinal length L of the resin member 52 is used herein as a reference. In Embodiments 1 and 2 the value obtained by dividing the difference O-L of the longitudinal lengths of the fixing film 112 and the resin member 52 by the longitudinal length L of the resin member 52 is 0.0698. Such being the case it suffices that Expression 1 below be satisfied, in order to prevent inflow of water vapor onto the print surface of the photosensitive drum 21.

$$(O-L)/L \geq 0.069 \qquad \text{Expression 1}$$

On the other hand, the results of Comparative examples 5, 9 and 10 reveal that outward airflow is insufficient, and water vapor flows onto the print surface of the photosensitive drum 21, in a case where the longitudinal length L of the resin member 52 is too small. Therefore, a relational expression for determining a minimum value of the longitudinal length L of the resin member 52, with a view to precluding the occurrence of image defects, will be worked out next.

Figure 10:
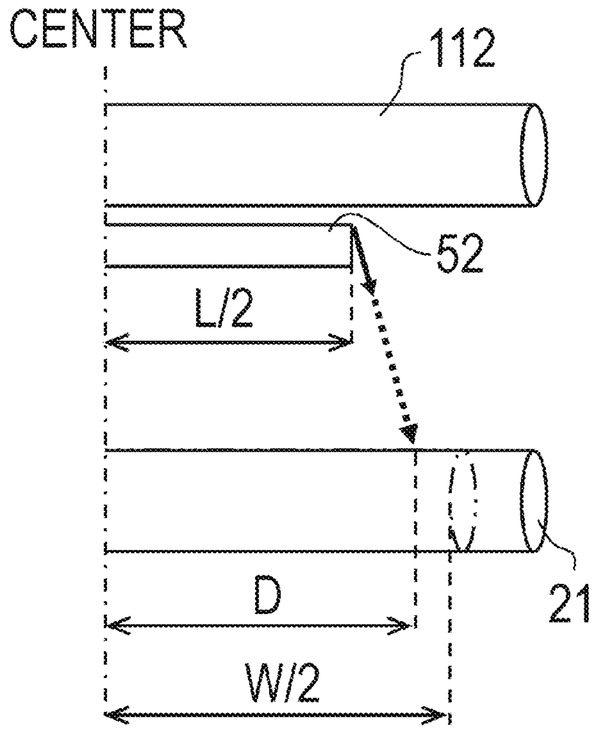
FIG. 10 is a schematic diagram illustrating airflow from a resin member to a fixing film.

The minimum longitudinal length L of the resin member 52 as required to preclude inflow of water vapor to the print surface of the photosensitive drum 21 depends on the direction of the airflow that passes by the sides at both ends of the resin member 52, as illustrated in FIG. 10. When the airflow hits the inward side of the print surface of the photosensitive drum 21, water vapor flows onto the print surface, and image defects occur. That is, airflow direction can be ascertained on the basis of the position of collision of airflow against the fixing film 112, i.e. the position at which image defects occur. Therefore, an additional paper passage evaluation was carried out for an instance where the longitudinal length L of the resin member 52 was 100 mm, as in Comparative example 11. The evaluation conditions are the same as those of the paper passage evaluation performed in the first embodiment and the second embodiment. FIG. 11 illustrates a table summarizing results, with a water vapor adhesion distance D as the distance from the longitudinal center up to the site of collision of airflow against the photosensitive drum 21. It is deemed that in Comparative examples 9, 10 and 11 image defects occurred because the water vapor adhesion distance D was shorter than half W/2 the print surface width. That is, in a case where the water vapor adhesion distance D is shorter than half W/2 of the print surface width, the water vapor adhesion distance D yields the longitudinal position of image defect occurrence, from the center on the fixing film 112.

In the present embodiment the longitudinal centers of the fixing film 112, the resin member 52 and the photosensitive drum 21 are positioned on a same plane perpendicular to the longitudinal direction, and the centers coincide with each other. As illustrated in FIG. 11, the positions at which image defects occur on the fixing film 112 lie outward of the resin member 52 in the longitudinal direction. From this result it can be concluded that airflow is directed outward by the resin member 52. Further, a longitudinal-direction distance D−L/2 from the longitudinal position of image defect occurrence on the fixing film 112 up to each end of the resin member 52 increases with increasing longitudinal length L of the resin member 52. That is, it is found that in a case where a sufficient gap is present to the sides of the longitudinal ends of the resin member 52, the larger the longitudinal length L of the resin member 52, the more pronounced becomes the outward directing action on airflow.

The occurrence or absence of image defects on the fixing film 112 has an impact, in addition to the longitudinal length L of the resin member 52 and the print surface width W, also on the distance N between the fixing nip Nf and the photosensitive drum 21. That is because for an identical direction of airflow passing by the longitudinal ends of the resin member 52, the larger the distance N between the fixing nip Nf and the photosensitive drum 21, the greater becomes the extent to which water vapor flows outward before reaching the photosensitive drum 21. In addition to the longitudinal length L and the print surface width W of the resin member 52, therefore, a relationship involving the distance N between the fixing nip Nf and the photosensitive drum 21 will now be addressed.

Figure 12:
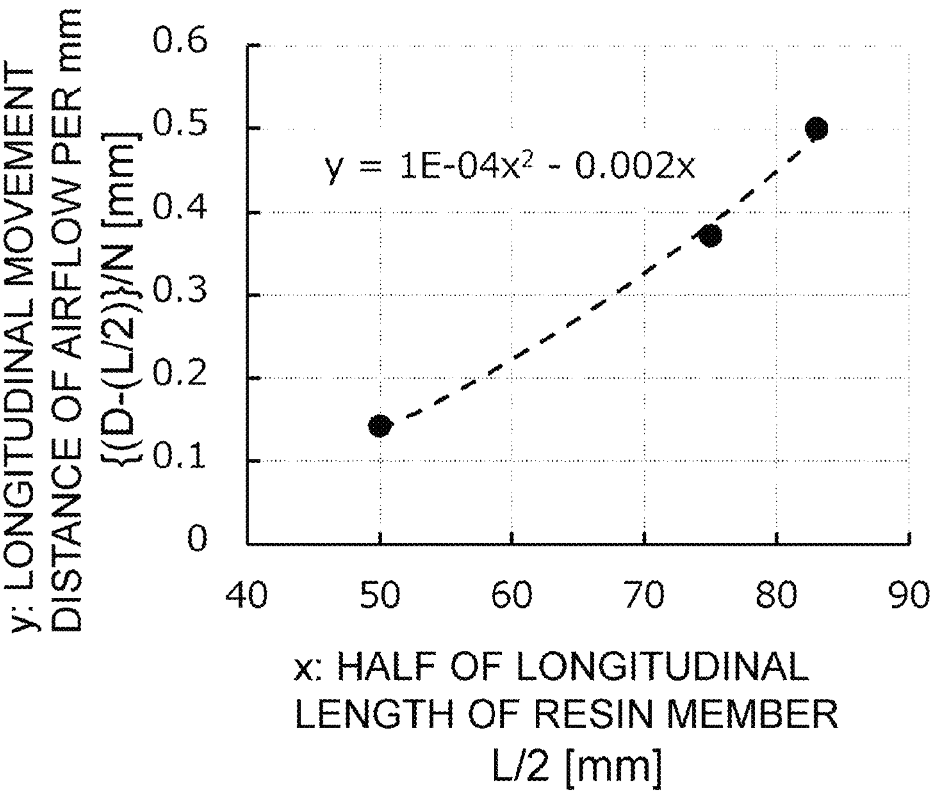
FIG. 12 is a diagram illustrating the relationship between airflow movement distance and a longitudinal length of a resin member.

The reach of outward airflow in the longitudinal direction when advancing 1 mm from the fixing nip Nf towards the photosensitive drum 21 can be expressed herein by $\{D-(L/2)\}/N$, as a longitudinal movement distance of airflow per mm. FIG. 12 illustrates, in the form of a graph, results for this numerical value and the value of half the longitudinal length L of the resin member 52, in Comparative examples 9, 10 and 11. In the graph the y axis represents the longitudinal movement distance of airflow per mm $\{D-(L/2)\}/N$, and the x axis represents a value L/2 of half the longitudinal length of the resin member 52. As is apparent from the graph, the larger the longitudinal length L of the resin member 52, the greater becomes the outward airflow. The relationship $y=0.0001\times x^2-0.002\times x$ is obtained as an approximate expression of the results of Comparative examples 9, 10 and 11. Further, it suffices that the water vapor adhesion distance D be larger than half W/2 of the print surface of the photosensitive drum 21, and that $W/2\le D$ be satisfied, in order to prevent water vapor from hitting the print surface of the photosensitive drum 21. The above expressions can be rearranged to yield Expression 2 below, for a configuration in which airflow does not hit the print surface of the photosensitive drum 21.

$$W \le 2\times(0.0001\times L/2\times L/2-0.002\times L/2)\times N+L \qquad \text{Expression 2}$$

By satisfying Expression 1 and Expression 2, thus, a configuration is achieved in which water vapor does not flow onto the print surface of the photosensitive drum 21. That is, an appropriate range of the longitudinal length L of the resin member 52 can be established on the basis of the longitudinal length O of the fixing film 112, the print surface width W of the photosensitive drum 21, and the distance N between the fixing nip Nf and the photosensitive drum 21.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-148344, filed on Sep. 13, 2021, which is hereby incorporated by reference herein in its entirety.

What is claimed is:

1. A heating device in which a recording material is heated at a nip portion, the heating device comprising:
- a first rotating member that is heatable by a heat source,
- a second rotating member that forms the nip portion with the first rotating member,
- a first cover made of metal, which is disposed along an outer peripheral surface of the first rotating member, so as to surround the first rotating member; and
- a second cover made of resin disposed between the first cover and the first rotating member and disposed at an end portion of the first cover on an upstream side of the nip portion in a conveying direction of the recording material, the second cover including a protruding portion that protrudes towards the first rotating member,
- wherein an entirety of the second cover, including the protruding portion, is disposed at the upstream side of the nip portion in the conveying direction of the recording material, and
- wherein in a longitudinal direction of the first rotating member, a length of the first rotating member is a first length, and a length of the protruding portion is a second length that is smaller than the first length.

2. The heating device according to claim 1, wherein:
- the first cover forms, with the outer peripheral surface, an airflow guide space in between; and
- the protruding portion protrudes so as to block airflow within the airflow guide space, in a rotation direction of the first rotating member.

3. The heating device according to claim 1, wherein the first cover is provided over an entirety of the first rotating member in the longitudinal direction.

4. The heating device according to claim 1, wherein the protruding portion is provided upstream of the nip portion, in a conveying direction of the recording material.

5. The heating device according to claim 4, wherein the protruding portion is provided at an end portion, of the first cover, on a side closer to the nip portion.

6. The heating device according to claim 1, wherein as viewed in the longitudinal direction of the first rotating member, a shortest distance from the second cover to the first rotating member is shorter than a shortest distance from the first cover to the first rotating member.

7. The heating device according to claim 1, wherein:
- the second cover further includes a contact surface in contact with the first cover;
- the protruding portion protrudes from a surface on the reverse side from that of the contact surface; and
- a length of the contact surface in a direction perpendicular to the longitudinal direction is greater than a length from the contact surface up to a tip of the protruding portion.

8. The heating device according to claim 1, wherein:
- the heat source is a heater disposed in an internal space of the first rotating member;
- the first rotating member is a tubular film;
- the second rotating member is a pressure roller having an elastic layer; and
- the film is nipped between the heater and the pressure roller, and an image on a recording material is heated via the film at the nip portion formed between the film and the pressure roller.

9. The heating device according to claim 1, wherein:
- the second cover includes a contact surface disposed to mirror the first rotating member so that a spacing between the first rotating member and the protruding portion is made narrower, and
- the protruding portion protrudes from a surface on a reverse side from that of the contact surface.

10. The heating device according to claim 1, wherein, as viewed from an end side of the first rotating member, a shortest distance between the first rotating member and the first cover or between the first rotating member and the second cover between the first rotating member and the protruding portion of the second cover.

* * * * *